(12) United States Patent
Phelps

(10) Patent No.: US 9,335,141 B2
(45) Date of Patent: May 10, 2016

(54) TAPE MEASURE MARKING ATTACHMENT

(71) Applicant: Chance Phelps, Virgina Beach, VA (US)

(72) Inventor: Chance Phelps, Virgina Beach, VA (US)

( * ) Notice: Subject to any disclaimer, the term of this patent is extended or adjusted under 35 U.S.C. 154(b) by 97 days.

(21) Appl. No.: 13/781,166

(22) Filed: Feb. 28, 2013

(65) Prior Publication Data
US 2014/0237838 A1  Aug. 28, 2014

(51) Int. Cl.
*G01B 3/10* (2006.01)

(52) U.S. Cl.
CPC ...... *G01B 3/1084* (2013.01); *G01B 2003/1076* (2013.01); *G01B 2003/1089* (2013.01)

(58) Field of Classification Search
CPC .. G01B 3/1071; G01B 3/1076; G01B 3/1089; G01B 2003/1076; G01B 2003/1089
USPC ............................................ 33/770, 768, 668
See application file for complete search history.

(56) References Cited

U.S. PATENT DOCUMENTS

| | | | | |
|---|---|---|---|---|
| 3,192,630 A * | 7/1965 | Dineson | | 33/42 |
| 3,509,631 A * | 5/1970 | Shimoyama | | 33/27.01 |
| 4,103,426 A * | 8/1978 | Robin | | 33/27.03 |
| 5,542,184 A * | 8/1996 | Beard | | 30/293 |
| 6,763,603 B2 * | 7/2004 | Carrabino | | 33/770 |
| 6,912,799 B1 * | 7/2005 | Smith | | 33/770 |
| 6,931,734 B2 * | 8/2005 | Elder et al. | | 33/42 |
| 7,260,898 B2 * | 8/2007 | Snelson | | 33/668 |
| 7,900,364 B2 * | 3/2011 | Lee | | 33/27.03 |
| 8,020,312 B1 * | 9/2011 | McGahan | | 33/770 |
| 8,819,954 B1 * | 9/2014 | Fernandez | | 33/668 |
| 2003/0159304 A1 * | 8/2003 | Black | | 33/668 |
| 2009/0249636 A1 * | 10/2009 | Reda et al. | | 33/760 |

* cited by examiner

*Primary Examiner* — Christopher Fulton

(57) ABSTRACT

An improved marking device for attaching to the end tab of a tape measure. The end tab of a tape measure is inserted into the marking device, and the bottom of the marking device has marking means affixed to the bottom surface of the marking device so that an operator may mark measurements as the measurements are made utilizing the tape measure.

5 Claims, 3 Drawing Sheets

TAPE MEASURE MARKING ATTACHMENT

BACKGROUND OF THE INVENTION

The present invention relates to marking devices. More particularly the present invention relates to improvements to tape measures whereby the tape measure is provided with means for marking distances on surfaces. Such markings can be utilized for measuring, cutting, and other related activities.

SUMMARY OF THE INVENTION

Tape measures are utilized in many arts, crafts, and professions. Plumbers, carpenters, electricians, and other trades people utilize tape measures daily in order to perform measuring and cutting tasks associated with particular work being accomplished. In doing so, accurate and repeatable measurements are critical. Accurate and repeatable measurements are especially critical when the tape measure is used to determine lengths and/or widths of objects for cutting. Measuring may be done more than once, but cutting can only happen once for a given piece of raw material. For example, if a measurement and cutting mark are off by a quarter of an inch on an eight foot piece of lumber for a wood deck, the entire piece of wood may have to be discarded. In many cases, the materials for a task are costly and so additional care must be made to ensure that no material is wasted and that that fit of the cut is exact.

The starting or zero point for measuring is at the end of a tape measure that is pulled out of the tape measure housing, and usually includes a portion that folds over the end of the tape measure. Self-retracting tape measures are the most common in use today. They generally comprise a semi-rigid metal tape portion, a housing, and retracting means located within the housing. The tape is wound around a spool or the like, which is attached to a coil spring or other means for retracting the tape back into the housing, spooling the tape as the tension on the coil spring is released by the rotation of the spool. The tape is generally pulled out of the housing by hand; the further the tape is pulled out of the housing (increasing the measuring distance) the more tension is created by the circular compression of the coil spring. The tape is restrained from entering the housing by the tab located at the end of the tape (the zero measurement point). The tab on the end of a tape measure can be hooked over the edge of a frame or object, allowing for the user to pull the tape along the length being measured. The tab may be joined to the tape by fastening means, such as rivets, that allow it to slide back and forth a short distance, allowing the user to take highly accurate internal and external measurements without the width of the tab itself creating incorrect readings. In most modern retractable tape measures, the tab is made of steel or some other metal, but other materials may be used.

While the tape is pulled out of the housing, it may be held in place by a commonly-used slide lock or other means.

While using a tape measure, some method and means of marking the measurement must be used. This can be accomplished in a number of ways, including using a marking instrument (such as a pen or pencil) or using some object with an edge or point to scratch a mark on the object being measured. However, this requires using an object external to the tape measure, and may introduce marking error. In addition, utilizing a secondary object requires keeping the marking instrument or other means close at hand so that it can be used in conjunction with the tape measure. Attempting to handle the tape measure and a marking tool or instrument can be awkward, as well as introducing errors into the marking and measurement. Pens and pencils can be misplaced, and standard pencils, including carpenter's pencils, need to be sharpened.

What is needed is:

A new marking device for use with tape measures, where the marking system can be attached to and operated simultaneously with the measuring tape. The marking device should be inexpensive, easy to use, and should remain attached to the tape measure when in use. The marking device may have a renewable ink or lead source, or the marking device may be disposable once the ink or lead used for marking has run out.

The new marking device may also be designed so that it can be attached to various sizes of tape measures.

SUMMARY OF THE INVENTION

It is therefore an object of the present invention to provide for a new, improved marking device for use with tape measures.

It is a further object of the present invention to provide a new, improved marking device that may be attached to multiple sizes of tape measures.

It is a further object of the present invention to provide a new, improved marking device that utilizes a renewable marking material.

It is a further object of the present invention to provide a new, improved marking device that may utilize either ink or pencil lead.

DESCRIPTION OF A PREFERRED EMBODIMENT

Figure 1:
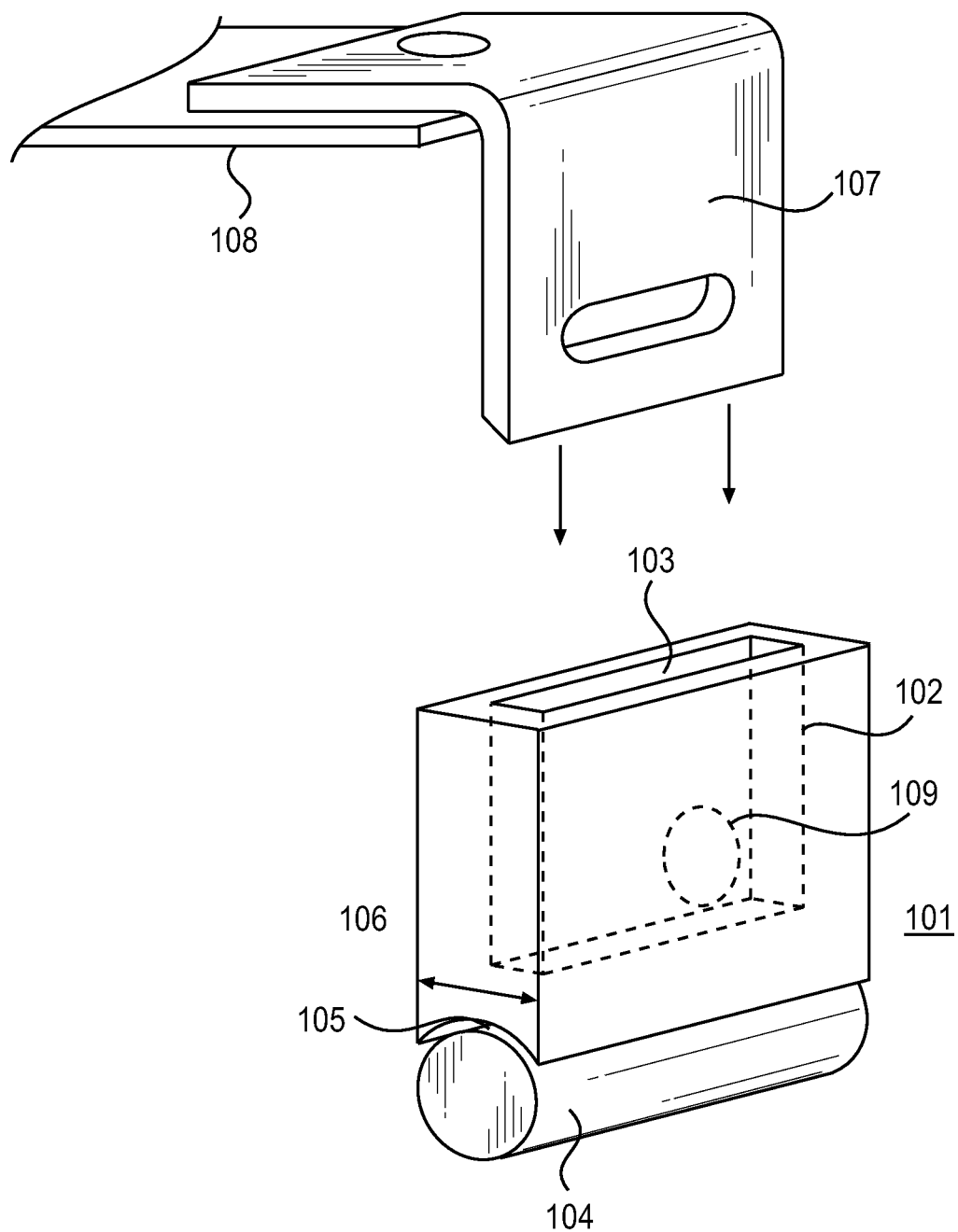
FIG. 1 is a view of an embodiment of the present invention showing a tape measure tab insertable into the body of the present invention.

Referring now to FIG. 1, an embodiment of the current invention is shown. The invention 101 comprises a body 102 with an opening 103 and, at the end distal to the opening 103 a marking portion 104. The body 102 is generally rectangular, but it will be understood that the shape of the body may vary according to the application and the type of tape measure to which the invention is attached without deviating from the scope and spirit of the invention. The bottom of the body 102 comprises a curved portion 105 along the short axis 106 of the body 102. The marking portion 104 is shown in this embodiment as a tubular-shaped piece of graphite or similar marking material that has a curvature corresponding to the curvature of the curved portion 105. The marking portion may be attached to the body 102 through well-known and commonly available adhesives. The opening 103 in this embodiment is shown as a rectangular opening; the opening is of sufficient dimensions and depth so as to correspond to the size of the tab 107 located on the end of the measuring portion 108 of the tape measure with which the invention is intended to be used. The invention may further comprise a raised portion 109 located within the opening 103 wherein the raised portion 109 engages with the tab 107 when the tab 107 is inserted within the opening 103, providing a mechanical friction restraint to assist in securing the invention to the tab 107.

Figure 2A:
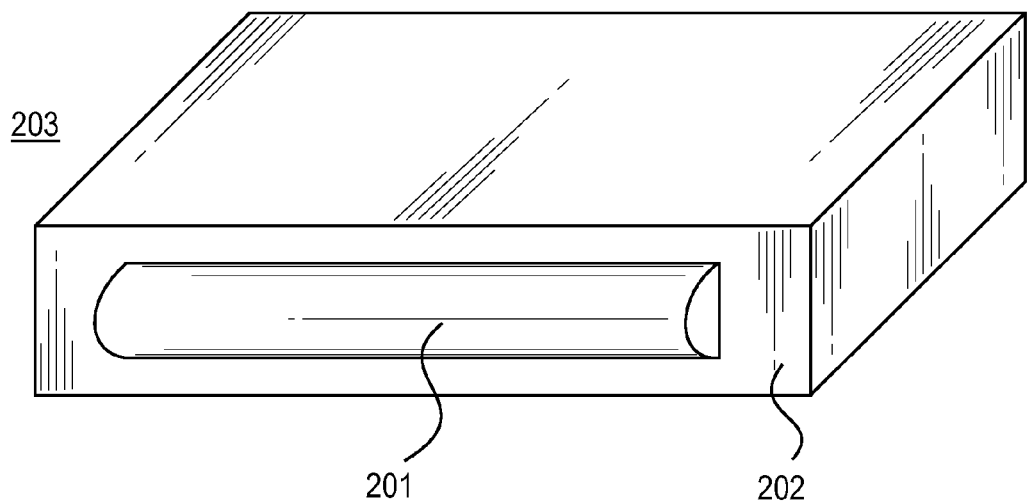
FIGS. 2(A) and (B) are views of an embodiment of the present invention showing positioning of a marking portion.
Figure 2B:
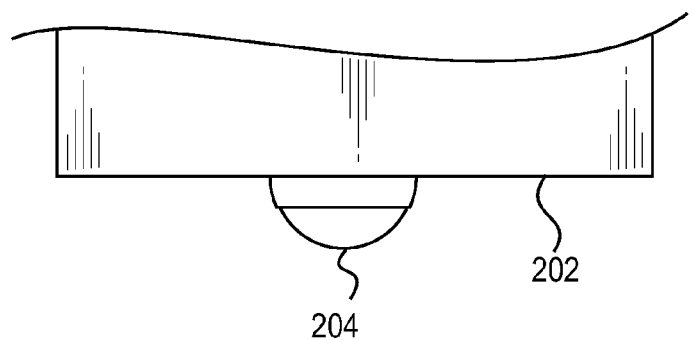

Referring now to FIG. 2, a view of an embodiment of the present invention is shown where the marking device may comprise a marking material 201, as shown in 2(a), and the marking material 201 has a semi-circular cross-section and may be glued or otherwise affixed to the bottom 202 of the invention 203. As above, the marking material 201 may be comprised of graphite or other marking material, and is preferentially chosen from the group of materials wherein the material is erasable. As shown in FIG. 2(b), the marking material 204 may comprise a point-shaped portion that is affixed to the bottom 202 of the invention. The marking material 204 may be comprised of lead-graphite or some equivalent marking material. The marking material may, in the alternative, be comprised of an ink-dispensing material such as felt, with the ink-dispensing material fed from an ink reservoir (not shown). It is well known in the art to incorporate an ink reservoir in a marking device.

Figure 3A:
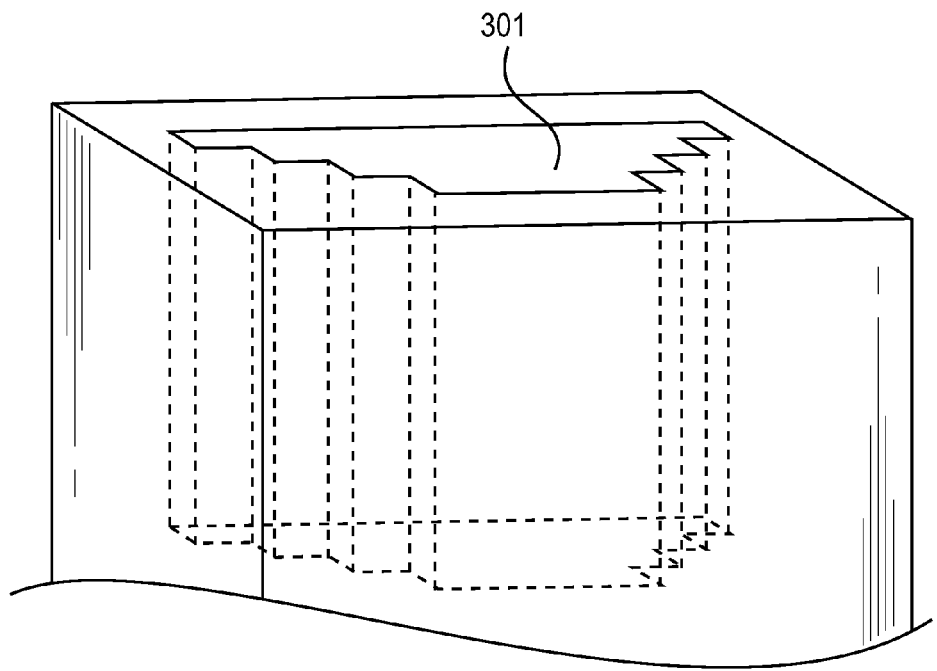
FIGS. 3(A) and (B) are views of an embodiment of the present invention showing an opening of varying width in accordance with an embodiment of the present invention.
Figure 3B:
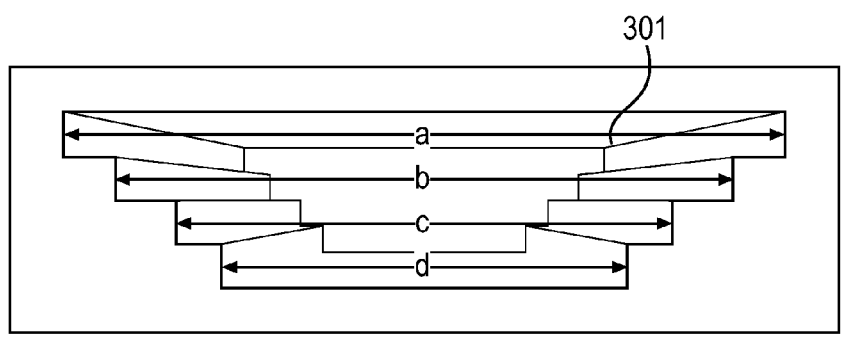

Referring now to FIG. 3, an embodiment of the present invention is shown wherein the opening 301 has graduated or "stepped" sides, as shown. The diameters a, b, c, and d (FIG. 3(B)) are chosen to correspond to common widths of tape measure tabs (FIG. 1, 107). It will be understood that the number and widths of the stepped opening may vary depending upon use and manufacturing desires or requirements, and that any such modifications are contemplated and are within the scope the present invention.

It will be understood that, while the invention is described in detail herein, embodiments exist which are not described herein but which are covered by and fall within the spirit and the scope of the invention as described.

What is claimed:

1. A tape measure marking device, the device consisting of: a body comprising six sides; a first side having an opening extending into the body wherein the opening extending into the body is rectangular and of such dimensions that a tape measure tab fits within the opening; the opening extending into the body further has two or more interior widths, the widths chosen from the group of widths of tape measure tabs; and a marking portion, the marking portion affixed to a second side, the second side located opposite the first side.

2. The tape measure marking device of claim 1 wherein the opening extending into the body is trapezoidal.

3. The tape measure marking device of claim 2 wherein the opening further comprises a raised portion located within the opening.

4. The tape measure marking device of claim 1 wherein the marking portion is pencil marking means.

5. The tape measure marking device of claim 1 wherein the marking portion is an ink marking means.

* * * * *